DEFLECTION SYSTEM

Filed June 22, 1950

2 SHEETS—SHEET 1

INVENTORS
SIMEON I. TOURSHOU
& ROBERT G. WOLCOTT
BY [signature]
ATTORNEY

INVENTORS
SIMEON I. TOURSHOU
& ROBERT G. WOLCOTT
BY Olin J. Mitchell
ATTORNEY

Patented Jan. 1, 1952 2,580,977

UNITED STATES PATENT OFFICE 2,580,977

DEFLECTION SYSTEM

Simeon I. Tourshou, Philadelphia, Pa., and Robert G. Wolcott, Haddon Heights, N. J., assignors to Radio Corporation of America, a corporation of Delaware Application June 22, 1950, Serial No. 169,655

9 Claims. (Cl. 315—27)

Figure 1:
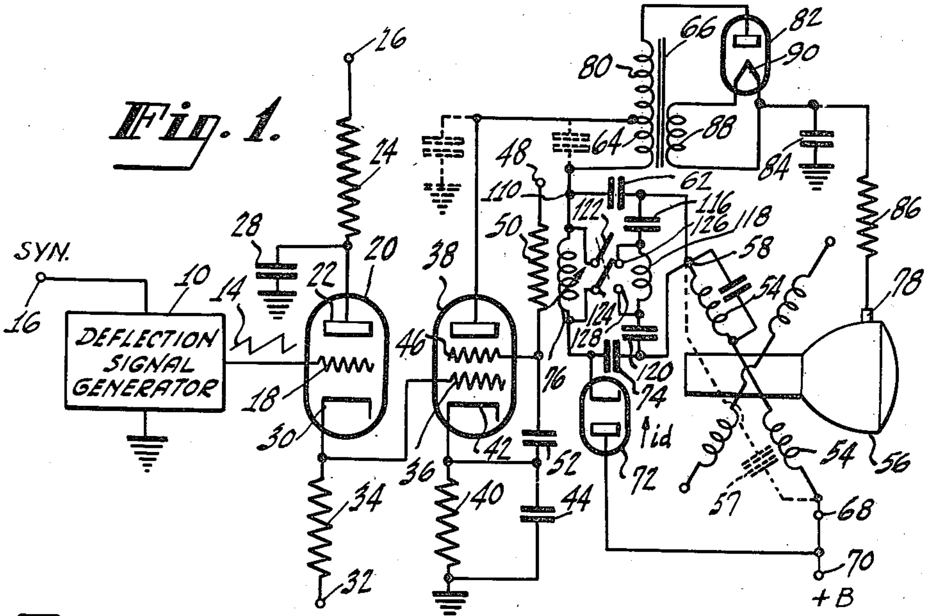

The present invention relates to electrical damping systems of the reaction scanning power recovery type and more particularly to electromagnetic cathode ray beam deflection circuits of the type employed in television systems wherein a portion of the damped reactive energy in the deflection system is fedback for utilization by the deflection circuit to thereby improve the overall operating efficiency of the system.

The present invention furthermore relates to improvements in television cathode ray beam deflection circuits of the "zoom" variety. That is, deflection circuits in which the degree of deflection may be instantaneously changed to alter the effective magnification of the scene appearing in the television picture viewing area.

In this regard the present invention is an improvement over the deflection system shown and described in another U. S. patent application, Ser. No. 90,612 entitled "Television Deflection Power Recovery Circuit" by Simeon I. Tourshou, filed April 30, 1949, now Patent No. 2,555,831, granted June 5, 1951.

In this copending application there is shown and described a particularly simple and novel electromagnetic deflection system of the direct drive variety. That is, a system in which the deflection yoke is connected in series with the anode circuit of the output tube. The present invention modifies this direct drive system to provide "zoom" control of the deflection amplitude. The good performance of the arrangement provided by the present invention is greatly supported by the high efficiency of the basic deflection system forming the subject of the above identified case.

Before considering the novel aspects of the present invention it is well first to consider some of the points brought out by the above noted Patent No. 2,555,831. For instance, in electrical circuits requiring damping action of some kind, it is proverbial that the overall efficiency of operation is considerably lowered because of the energy dissipated in the damping circuits, this energy not being gainfully utilized. In early television practice, cathode ray electromagnetic beam deflection systems suffered substantial losses in this respect, which in turn stimulated the development of power recovery deflection systems in which some of the stored electromagnetic reactive energy, normally dissipated in the damping system, is capacitively stored and employed to effect a boost in the "B" supply voltage applied to the vacuum tube driving the deflection system. Such power recovery or power feedback systems have greatly improved the operating efficiencies obtainable in deflection systems as a whole. However, most prior art systems of this kind require the utilization of a deflection coupling transformer in order to realize reactive damping currents of proper magnitude to readily permit power feedback into the B supply circuit of the driving vacuum tube. The use of a transformer in this connection, of course, represents certain additional costs in circuit construction as well as introducing inherent losses in the system due to leakage reactance and magnetic hysteresis. The losses incurred through use of a transformer for coupling energy from the plate circuit of the deflection driving tube to the damped deflection yoke, of course, may be obviated by direct inclusion of the yoke in the anode circuit of the vacuum tube. However, a direct drive reaction scanning connection of this type has not been regarded as readily lending itself to a high efficiency power recovery operation. Another problem in connection with such a direct drive system is that of obtaining sufficient linearity of sweep during that portion of the deflection cycle supplied by the reaction scanning action.

Furthermore, in television receiver applications, the direct drive arrangement for the deflection yoke has in the past displayed another awkward feature, that being the difficulty of obtaining from the deflection system an economical form of pulse step-up power supply for development of an accelerating potential for the associated cathode ray reproducing device.

In a copending application by Simeon I. Tourshou and William E. Scull, Jr., Serial No. 56,562, filed October 26, 1948 entitled "High Voltage Power Supply," now Patent No. 2,555,827, granted June 5, 1951, this latter difficulty has been overcome in part through the use of an auto transformer having its primary connected in series with the deflection yoke circuit. The high voltage pulses appearing in the secondary winding are then rectified to produce the appropriate high unidirectional beam accelerating potential. The inclusion of this autotransformer primary in the yoke circuit does, however, reduce to a considerable extent the operating voltage actually supplied to the anode of the output tube and consequently a somewhat higher B+ power supply potential is normally required to correct for this voltage drop. This provision of such an increase in the initial "B" potential demands considerable additional cost in the design of the television receiver low voltage power supply.

In some television circuit arrangements, it is moreover desirable to employ a somewhat higher value of the operating potential than normally made available by conventional economical low voltage power supplies. In this respect, power recovery systems of the "B" boost type are of additional value in that the energy recovered from the deflection circuit is utilized to establish a boost voltage above the available low voltage power supply of several hundred volts or more. Particularly in conventional forms of direct drive deflection systems, however, in which "B" boost power supply action is attained, the resulting boost and voltage has in it an alternating current pulse component which is generally undesirable. Ordinary filter arrangements for eliminating this undesirable pulse component due to kickback in the deflection system either unduly load the deflection yoke itself or result in an extremely high terminal impedance for the boosted voltage.

It was with these considerations in mind that the low cost deflection system of the above referenced copending U. S. patent application, Ser. No. 90,612, Patent No. 2,555,831, was conceived. Now, however, modern day trends lean toward the provision of the above mentioned "zoom" control. "Zoom" control allows the deflection amplitude developed by the deflection circuit to be instantaneously jumped from one value to another. When the deflection amplitude increases over normal, this makes the center of the television picture appear to be magnified.

The present invention aims to provide a high efficiency low cost reaction scanning system of the direct drive "B" boost type which has a "zoom" type amplitude control of the developed deflection stimulus.

It is therefore a purpose of the present invention to provide an improved form of reaction scanning power recovery damping system for direct drive electromagnetic beam deflection systems which exhibits an efficient "B" boost action coupled with an attendant high degree of deflection linearity and instantaneous type amplitude control.

It is another object of the present invention to provide a "B" boost reaction scanning system for direct-coupled electromagnetic deflection yokes which provide boosted terminal voltage having a ripple component substantially lower than prior art systems of a similar general type yet permitting the system to have a very versatile control of deflection amplitude.

It is another purpose of the present invention to provide an improved form of "zoom" type deflection circuit for television systems wherein a portion of the cyclically damped reactive energy in the yoke circuit is applied for effectively boosting the available polarizing potential of the driving vacuum tube.

Still another object of the present invention resides in the provision of a novel form of power recovery and amplitude control system particularly applicable to directly driven electromagnetic deflection coils in television systems wherein the deflection coils are included in the series with the anode-cathode circuit of the deflection system driving vacuum tube.

In order to realize the above, objects and features of the following example of a specific embodiment of the present invention may be considered. For instance, the direct drive deflection system of the type shown in the above referenced Tourshou patent application 90,612, Patent No. 2,555,831 requires a deflection yoke to be placed in series with a first capacitor between the anode of the deflection output tube and a source of +B power. The system further provides that an inductance and capacitance combination may be placed in shunt with the first capacitor and a diode then connected between the inductance and the source of +B power. The present invention then provides means for varying the values of the inductance and capacitances at the same time in such a way as to maintain a proper degree of linearity in the deflection signal at the same time causing its amplitude to vary over a relatively wide range.

The present invention has numerous other objects and features of advantage, some of which, together with the foregoing will be set forth in the following description of specific apparatus embodying and utilizing the invention's novel method. It is therefore to be understood that the present invention is not limited in any way to the apparatus shown in the specific embodiments as other advantageous applications in accord with the present invention, as set forth in the appended claims, will occur to those skilled in the art after having benefited from the teachings of the following description especially when considered in connection with the accompanying drawings in which:

Figure 1 schematically illustrates one form of the present invention as applied to a television type cathode ray beam deflection system.

Figure 2:
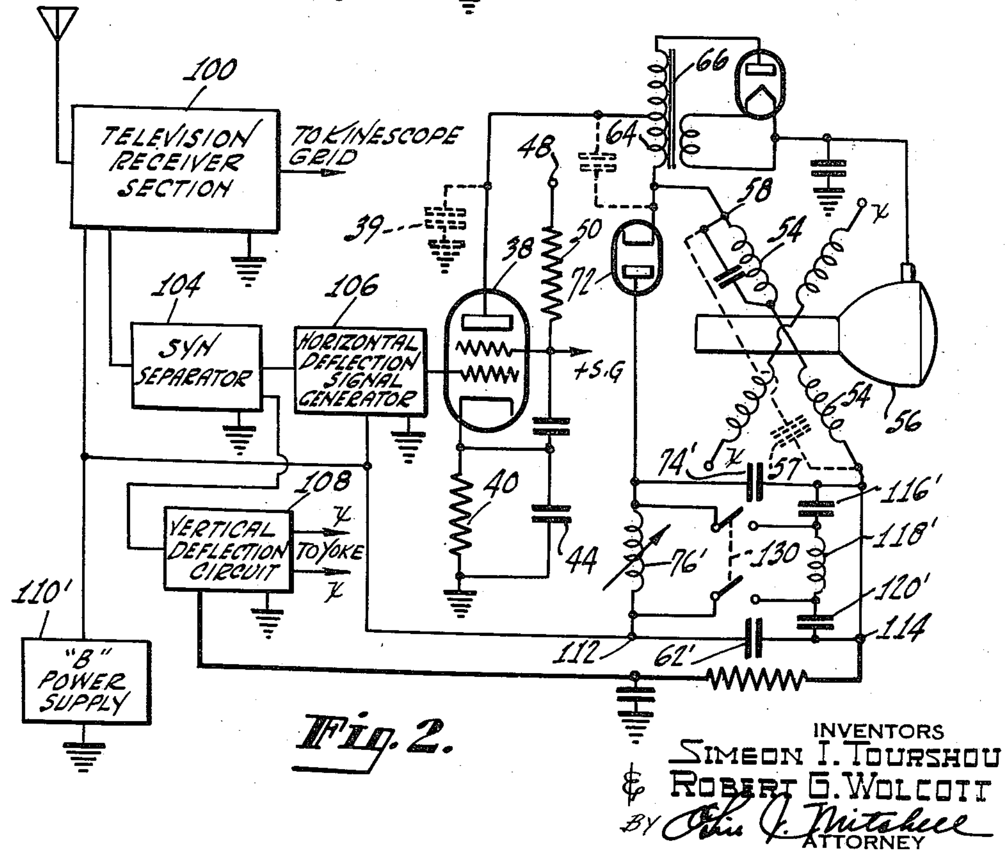

Figure 2 is a schematic representation of another form of the present invention as applied to a typical television receiver.

Figure 3:
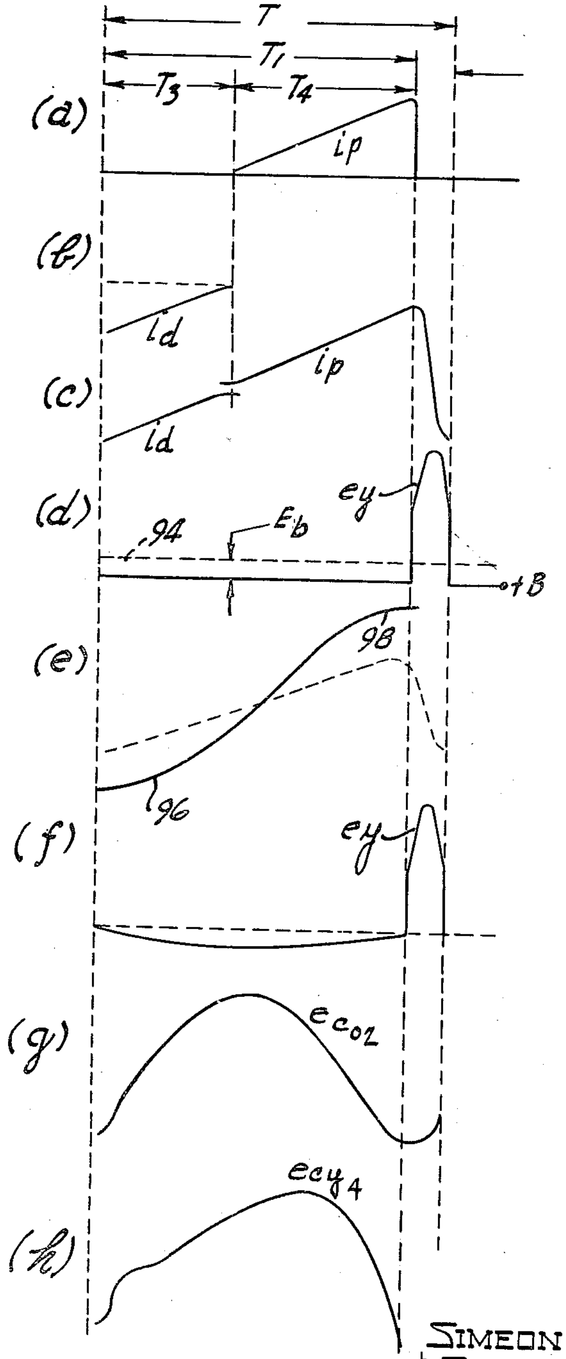

Figure 3 graphically illustrates certain waveforms peculiar to the operation of the present invention.

For purposes of clarity, full consideration will first be given to the general direct drive deflection system described in the above mentioned patent application by Simeon Tourshou, Ser. No. 90,612, filed April 30, 1949, now Patent No. 2,555,831. After understanding its rather complex operating principles, then special attention will be directed to those improvements on the Tourshou circuit which comprise the subject of the present invention. Therefore, let us turn to Figure 1, which illustrates a conventional form of television deflection circuit. There is shown at 10 a source of sawtooth deflection signal having a waveform substantially as illustrated at 14. A synchronizing signal may be applied to the terminal 16 for synchronizing the developed sawtooth signal 14. The developed sawtooth signal is then applied to the control grid 18 of a cathode follower type amplifier stage employing discharge tube 20. The anode 22 of the discharge tube 20 receives a suitable positive bias through dropping resistor 24 connected with a source of positive potential 26, by-pass condenser 28 maintaining the anode 22 at substantially A. C. ground potential. Connected between the cathode 30 of the cathode follower amplifier and a source of negative biasing potential 32 is a cathode follower load resistor 34 whose upper end is directly coupled to the control grid 36 of the deflection output discharge tube 38. The resulting low impedance of the cathode follower circuit permits higher amplitude drive of the control grid 36 without encountering undesirable distortion due to grid current flow. A suitable cathode biasing 40 is connected between the cathode 42 of discharge tube 38 and ground potential, by-pass capacitor 44 being provided to reduce degeneration in the cathode circuit. A screen grid 46 is connected with a source of positive potential 48 through a screen dropping resistor 50, which is in turn by-passed to the cathode by means of capacitor 52.

According to the previous arrangement described in the above mentioned U. S. patent application Ser. No. 90,612, now Patent No. 2,555,831, in order to achieve "B" boost power recovery reaction scanning with the deflection yoke 54, positioned for deflection of the beam in the cathode ray tube 56, the upper terminal 58 of the yoke 54 is connected with the driver tube anode 60 through "B" boost capacitor 62, which in turn is connected with the primary 64 of the pulse step-up autotransformer 66. The lower terminal 68 of the deflection winding is then connected with a source of positive potential 70 from which is supplied energy to the deflection circuit. A damping diode 72 is provided for damping the deflection yoke 54 and is connected in shunt therewith through capacitor 74 as well as through variable linearity control inductance 76 and capacitor 62.

The form of high voltage power supply for the accelerating anode 78 of the kinescope 56 is based upon the high voltage pulse step-up transformer 66 and is disclosed in more detail in the above noted Patent No. 2,555,827. As more fully described in the related specification, the deflection current for the yoke winding 54 must pass through the primary 64 of the autotransformer 66 and therefore induces in the secondary 80 high voltage positive going pulses corresponding in time to the retrace portion of the deflection cycle. These high voltage pulses are then rectified by the diode 82 to develop a high unidirectional potential across the storage capacitor 84. The voltage appearing thereacross is then applied through the filter resistor 86 to the accelerating terminal 78 of the cathode ray tube 56. The auxiliary winding 88 of the autotransformer 66 supplies heater power for the filament 90 of the high voltage rectifier 82.

The operation of the general Tourshou deflection system upon which the present invention is based may be best understood through reference to the curves of Figure 3. For purposes of simplicity this direct drive system disclosed in the above mentioned Patent No. 2,555,827 will be referred to hereinafter as the "Tourshou direct drive system." Here the deflection circuit can be seen to operate as a reaction type of scanning circuit, that is, the desired sawtooth of current through the deflection yoke 54 is comprised of two sections, namely, a first portion produced by anode current ($i_p$) of the driver tube 38 (shown in curve 3*a*) and a second portion provided by current ($i_d$) representing magnetic energy stored in the deflection yoke and damped by the damper tube 72. As is well known to those skilled in the art, in such a system the driver tube 38 is biased sufficiently beyond cut-off such that only the upper portion of the sawtooth 14 causes conduction in the anode circuit. With normal circuit operating efficiency, this conduction period $T_4$ represents a little more than half of the linear rise time $T_1$ of the current sawtooth having a period of T. In Figure 3*a* at the end of the time $T_1$ which represents the positive peak of the driving sawtooth 14, the discharge tube 38 is rendered non-conductive by the downward vertical portion of the sawtooth. However, the energy represented by the current in the yoke 54 at that time causes the yoke circuit and its associated stray capacitance to begin free oscillation. After a half cycle of free oscillation, the upper end 58 of the deflection yoke 54 then starts to go negative with respect to the lower end of the deflection coil 68 which is connected to the positive power supply terminal 70. When this occurs the damping diode 72 conducts and provides damping of the magnetic energy in the yoke and in so doing produces current in the direction of the arrow $i_d$ at 92. The direction of flow of this current $i_d$ as illustrated in Figure 3*b* is opposite to the current $i_p$ in Figure 3*a* so that two current flow curves $i_d$ and $i_p$ in Figures 3*a* and 3*b* will tend to merge as in Figure 3*c* to form a substantially linear sawtooth rise time $T_1$. Since this rise time represents a linear increase in current flow through the yoke 54, during the time $T_1$, it is evident that the voltage developed across the yoke terminals will be substantially equal to $$L\frac{di}{dt}$$

But, since during conduction of the damping diode 72, the cathode 73 thereof is held at positive B+ potential of terminal 70, the capacitor 62 in combination with capacitor 74 and inductance 76 will charge up to substantially the value of $$L\frac{di}{dt}$$

thereby making the loop voltage of the damped yoke circuit necessarily equal to zero. As indicated by the direction of current flow $i_d$, the capacitors 62 and 74 will charge up in such a direction to increase the effective plate potential applied to the driver tube 38 at the time of its next conduction period commencing shortly before the end of $T_3$.

Further considering the Tourshou direct drive system, it is seen then that the positive potential developed across the capacitors 62 and 74 will represent a portion of magnetic energy stored in the yoke 54 at the end of the linear rise time $T_4$. As noted, the conduction of the damper diode 72 prevents the terminal 58 of the deflection yoke from going appreciably more negative with respect to ground than the positive "B" potential at terminal 70. The average "B" boost thereby represented by the stored energy on capacitors 62 and 74 may be illustrated by dashed line 94 in Figure 3*d*. Dashed line 94 is merely the A. C. axis of the yoke voltage $E_y$ which, as stated, cannot go appreciably more negative than +B. Thus, the average potential boost in the circuit will be presented by the voltage $E_b$ defined by dashed line 94 in Figure 3*d*.

According to the previous description of the Tourshou system, the sawtooth of current developed through the yoke 54 would be presumed to be substantially linear and except for the presence of the inductance 76 in Figure 1 would be substantially linear. However, as was shown in U. S. Patent 2,440,418, entitled "Cathode Ray Beam Deflecting Circuit" issued April 27, 1948, in television practice it is generally desirable to purposely distort the developed sawtooth current to compensate for the screen flatness of the cathode ray tube 56. The form of necessary distortion is illustrated in Figure 3*e*, which shows that the desired current waveform through the yoke is rounded at 96 and at 98 compared to the more perfect sawtooth shown in dotted lines. This rounding off therefore tends to reduce the rate of beam movement at the extremities of beam scansion, as described in my above referenced patent, and so compensates for screen flatness.

This prior art action of inductance 76 to achieve this improvement in beam distribution scanning linearity may be best discerned by curves Figure 3*g* and Figure 3*h*. Figure 3*g* represents the voltage appearing across the capacitor 62 due to that portion of the yoke sawtooth of current passing therethrough while the voltage appearing across capacitor 74, due to that portion of yoke current passing through it is shown by curve 3*h*. By properly relating the values of capacitor 62 to capacitor 74 in combination with the choice of inductance 76, the magnitudes of the two voltages in Figures 3*g* and 3*h* can be controlled. Since these voltages in fact appear in series with the anode circuit of the vacuum tube 38 as well as the damper diode 72, they will contribute in determining the waveform of the current passing through the yoke. The resulting voltage therefore appearing across the yoke 54 will be somewhat as shown in Figure 3*f* which can be seen to agree with the desirably yoke current characteristics as set forth in Figure 3*e*.

In the Tourshou direct drive system, by varying the inductance 76, the phase and magnitude of the ripple-voltage appearing across the capacitors 62 and 74 can be changed relative to one another thereby permitting quite a versatile control over the scanning linearity produced by the circuit.

The general direct drive deflection arrangement shown in a specific form in Figure 1, may be practiced in a variety of forms, one of which forms having other features of advantage is shown in Figure 2. Here a typical television receiver arrangement is illustrated comprising a receiver section 100, which may include the well-known television receiving components such as an RF amplifier, an oscillator, a converter, an IF amplifier, video demodulator, and video amplifier. The output of the video amplifier is indicated for connection to the grid of a kinescope such as 56 which is also shown in Figure 1 and duplicated in Figure 2 for sake of descriptive simplicity. The television receiving arrangement also includes a sync separator 104, whose output is applied to synchronize a horizontal deflection signal generator 106 and vertical deflection circuit 108. The output of the vertical deflection circuit is available at terminals X—X indicated for connection to the vertical deflection yoke X—X at 110. The horizontal deflection signal generator 106 may be compared to the deflection signal generator 10 of Figure 1 taken in combination with the cathode follower amplifier 20, so that the output vacuum tube 38 may be properly driven with a sawtooth of voltage. Again for sake of simplicity, the circuit arrangement of Figure 1, as well as corresponding indexes, have been duplicated wherever possible in Figure 2. Examples of typical circuit arrangement applicable to the functions depicted by the various blocks of Figure 2 are given in an article entitled "Television Receivers" by Antony Wright appearing in the March 1947 issue of RCA Review. Normal B+ operating potential for the various blocks is illustrated as being provided at 110, the B+ power supply connections themselves being indicated by darker lines.

As hereinabove noted in television circuit design, it is oftentimes desirable to supply a particular circuit with a higher operating potential than nominally supplied by the "B" power supply unit for the remainder of the associated circuits. For example, in Figure 2 it may perhaps be desirable to supply the vertical deflection circuit 108 with an increased B+ operating potential in order to achieve sufficient deflection swing in the vertical yoke winding X—X. Of course, in Figure 1, terminal 110 of storage capacitor 62 will evidence an increased positive potential due to the power recovery "B" boost action hereinabove described. However, at terminal 110, which is at the upper end of the deflection yoke winding 54, there also appears a rather high positively going pulse during the retrace period as evidenced by Figure 3*d*. In order to satisfactorily apply the potential at terminal 110 to the vertical deflection circuit, it would then be necessary to accomplish substantial filtering of the voltage which calls for the use of an additional filter inductance and capacitance combination or a somewhat less expensive RC type of filter. Although considerably more economical, the RC filter would have the disadvantage of expressing a much higher terminal impedance to the vertical deflection circuit which in some instances would prohibit its use.

According to Figure 2, and still considering the Tourshou direct drive system, the basic "B" boost action of Figure 1 is preserved, but is rearranged so that the actual boosted "B" voltage appears at the lower end of the deflection yoke 54 and therefore does not include the higher potential positive-going fly-back or retrace pulse. This can be seen by noting that in Figure 2, the primary 64 of the autotransformer 66 is directly connected to the terminal 58 of the deflection winding 54 while the counter parts of capacitance 74, inductance 76, and storage capacitor 62 are respectively at 74′, 76′ and 62′ in Figure 2. Nominal "B" power supply potential for the operation of the deflection circuit is applied at terminal 112 of the inductance 76 whereas the "B" boost voltage appears at terminal 114 of storage capacitor 62. Since a parabolic voltage, such as shown in Figures 3*g* and 3*h* are respectively developed across capacitors 62′ and 74′, with the variable inductance 76′ connected therebetween, the same type of linearity control action will be obtained as in Figure 1. Inasmuch as the voltage appearing at terminal 114, although not containing the high amplitude fly-back pulse of Figure 3 does contain a small amount of ripple voltage, it should be filtered to some extent such as by a relatively low impedance RC network comprising resistor 116 and capacitor 117. The voltage then appearing across capacitor 117 will be substantially equal to the boosted voltage $E_b$ illustrated at Figure 3*d*. This may be applied directly to the vertical deflection circuit 108 as shown.

In the operation of the basic Tourshou direct drive deflection system in Figures 1 and 2, on which the present invention is based, it has been described that the actual "B" boost power recovery action is achieved by cyclically capturing magnetic energy stored in the deflection yoke by means of the damping diode 72 and applying the same to the "B" boost capacitors 62 and 74. Although this forms one of the basic operating principles underlying the Tourshou arrangement, the most efficient operation and satisfactory utilization of the invention is made possible by a somewhat detailed consideration of various other factors involved in its operation which, due to their rather obscure nature and a present deside to impart a clear understanding of general circuit operation, have hereinabove been intentionally omitted.

Thus in the Tourshou system and looking at Figure 1, and more particularly Figure 2, let there now be considered the effects of the output capacitance 39 (shown in dotted lines) of the output tube 38, as well as the shunt capacitances 55 and 57, respectively representing the well-known yoke balancing capacity and overall yoke shunt terminal capacitance. Through the series resonant circuit, formed by the combined effects of capacitors 55 and 57, the primary 64 of the high voltage pulse step-up transformer 66, the output capacitance 39 of the vacuum tube 38, and the "B" boost capacitor 62' acting through the chassis ground and the "B" power supply 110, some of the energy stored in the pulse step-up transformer primary 64 will find transfer to the "B" boost capacitors 62' and 74' during the retrace portion of the deflection cycle. This comes about by way of the fact that at the beginning of the retrace interval at which time, as hereinbefore described, vacuum tube 38 is rendered non-conductive, the magnetic energy stored in the primary 64 will cause the series resonant circuit just described to commence ringing or oscillating. The frequency of this ringing will be made a function of the primary shunt capacitance 65 acting across the inductance 64 as well as the remaining circuit stray capacitance acting through ground. If now the frequency of the transformer primary resonant circuit is properly adjusted relative to the resonant frequency of the series circuit formed by the yoke 54 taken in combination with its overall shunt capacitances 55 and 57, the ringing of the high voltage transformer primary may be allowed to complete sufficient free oscillation to actually supplement the terminal voltage of the yoke stray capacitance 57. This occurs at a time when the terminal voltage of the yoke 54 would otherwise be measurably lower. Of course, this action will increase the actual energy damped by the damper 70 and correspondingly, the "B" boost energy applied to the storage capacitors 62' and 74'.

In accordance with the present invention a novel instantaneous width control is provided for the above described Tourshou direct drive deflection circuit. This is accomplished by conditionally switching in a sweep expanding circuit in shunt with the above described linearity inductance and "B" boost capacitor configuration of the Tourshou circuit.

For example, the sweep expanding circuit of the present invention is applied to the arrangement of Fig. 1, comprises the series combination of capacitor 116, inductance 118 and capacitor 120. A single throw, double pole switch or the equivalent is then provided having armatures 122 and 124 respectively cooperating with contacts 126 and 128. The opposite extremities of inductance 118 are connected with the contacts 126 and 128.

Should now, according to the present invention, it be desired to expand the effective sweep deflection of the circuit shown, all that is necessary is to close the single throw, double pole switch. When this is done the inductance 118, is placed in shunt with the inductance 76 while the capacitors 116 and 120 are respectively placed in shunt with the capacitors 62 and 74. It is important to notice that by closing the single throw, double pole switch the values of capacitors 62, 74, as well as the inductance 76 are concomitantly altered. The effective inductance in series with the deflection damping circuit will of course be less while the effective capacitor will be greater.

Similarly, in Fig. 2 the sweep expanding circuit of Fig. 1 has been shown as applied to the linearity inductance and "B" boost capacitor configuration comprising capacitor 74', inductance 76' and capacitor 62'. The double pole, single throw switch 130 is connected in the same manner as the switch in Fig. 1. When the switch 130 is closed the inductance 118' in Fig. 2 is placed in shunt with the inductance 76'. At the same time capacitor 116' is placed in shunt with capacitor 74' and capacitor 120' is placed in shunt with the capacitor 62'. This will increase the effective deflection amplitude through the deflection yoke 54.

It is to be noted that in some instances the connection of the sweep expanding circuit of the present invention as shown in Figs. 1 and 2 may produce some non-linearity at the view peaks of the deflection sawtooth. However, this is of no importance since these peaks correspond to beam positions on the cathode ray tube falling outside the normal viewing area as of course must be the case if effective picture magnification is to be realized by sweep expansion techniques.

Having thus described our invention what we claim is:

1. In an electromagnetic cathode ray deflection system in combination, output terminals across which is developed a deflection wave form, an electromagnetic deflection yoke, a first capacitor connected in series with said deflection yoke to form a combination, connections placing said capacitor and yoke combination in shunt with said output terminals, a first inductance and second capacitor connected in series to form a combination, connections placing said inductance capacitor series combination in shunt with a portion of said yoke capacitor combination and embracing said first capacitor, a damping device connected in shunt with said yoke capacitor combination through at least a portion of said inductance, a third and fourth capacitor adapted for conditional shunt connection across said first and second capacitors respectively, a second inductance adapted for conditional shunt connection with said first inductance, and switching means for concomitantly establishing said third and fourth capacitors in respective shunt connection with said first and second capacitors, and said second inductance in shunt with said first inductor.

2. Apparatus according to claim 1 wherein said output terminals are established in the output anode cathode circuit of an electron discharge tube such that one output terminal is connected with said discharge anode and the other output terminal is connected to said discharge tube cathode and wherein said first capacitor is connected between said discharge tube anode output terminal and said deflection yoke.

3. Apparatus according to claim 1 wherein said output terminals are established in the output anode cathode circuit of an electron discharge tube such that one output terminal is connected with said discharge anode and the other output terminal is connected to said discharge tube cathode and wherein said first capacitor is connected between said discharge tube cathode output terminal and said deflection yoke.

4. In an electromagnetic cathode ray beam deflection system employing a deflection yoke, the combination of input terminals adapted to receive a deflection wave form suitable for application to the deflection yoke, first variable capacitive means connected in series with the deflection yoke to form a yoke capacitor combination, a second variable capacitor and variable inductance means connected in series to form an inductance capacitor combination, connections placing said inductance capacitor combination in shunt with the portion of said capacitor yoke combination which embraces said first variable capacitive means, damping means connected between said variable inductance means and the terminal of the deflection yoke not connected with said first variable capacitive means, and means for concomitantly increasing the capacitive value of said variable capacitive means at the same time decreasing the inductance value of said variable inductance means.

5. In an electromagnetic cathode ray beam deflection system employing a deflection yoke, the combination of input terminals adapted to receive a deflection wave form suitable for application to the deflection yoke, first variable capacitive means connected in series with the deflection yoke to form a yoke capacitor combination, a second variable capacitor and variable inductance means connected in series to form an inductance capacitor combination, connections placing said inductance capacitor combination in shunt with the portion of said inductance yoke combination which embraces said first variable capacitive means, damping means connected between said variable inductance means and the terminal of the deflection yoke not connected with said first variable capacitive means, and means for concomitantly varying said first and second variable capacitive means in a capacitive increasing direction while at the same time varying said variable inductance means in an inductance decreasing direction.

6. Apparatus according to claim 5 wherein said input terminals are supplied with a deflection signal by an electron discharge tube amplifier having at least an anode and cathode and wherein said anode is connected to one of said input terminals designated as the first input terminal, while an anode supply potential source is connected between said discharge tube cathode and said other input terminal designated as the second input terminal.

7. Apparatus according to claim 6 wherein said first variable capacitive means is connected between said first input terminal and the deflection yoke.

8. Apparatus according to claim 6 wherein said first variable capacitive means is connected between said second input terminal and said deflection yoke.

9. Apparatus according to claim 6 wherein there is additional inductance means connected between one of said input terminals and said yoke capacitor combination but embraced by the shunt connection of said variable inductance capacitor combination.

SIMEON I. TOURSHOU.
ROBERT G. WOLCOTT.

REFERENCES CITED

The following references are of record in the file of this patent:

UNITED STATES PATENTS

| Number | Name | Date |
|---|---|---|
| 2,470,197 | Torsch | May 17, 1949 |
| 2,499,080 | Webb | Feb. 28, 1950 |